US010931111B2

(12) United States Patent
Lelusz et al.

(10) Patent No.: US 10,931,111 B2
(45) Date of Patent: Feb. 23, 2021

(54) POWER DISTRIBUTION CONTROL SYSTEM WITH IMPROVED RESPONSIVENESS

(71) Applicant: ORIGAMI ENERGY LIMITED, Cambridge (GB)

(72) Inventors: Jerzy Lelusz, Cambridge (GB); Oliver William John Burstall, Cambridge (GB)

(73) Assignee: ORIGAMI ENERGY LIMITED, Cambridge (GB)

( * ) Notice: Subject to any disclaimer, the term of this patent is extended or adjusted under 35 U.S.C. 154(b) by 0 days.

(21) Appl. No.: 16/325,988

(22) PCT Filed: Aug. 11, 2017

(86) PCT No.: PCT/GB2017/052376
§ 371 (c)(1),
(2) Date: Feb. 15, 2019

(87) PCT Pub. No.: WO2018/033710
PCT Pub. Date: Feb. 22, 2018

(65) Prior Publication Data
US 2019/0173282 A1    Jun. 6, 2019

(30) Foreign Application Priority Data

Aug. 16, 2016 (GB) .................... 1614029

(51) Int. Cl.
*H02J 3/14* (2006.01)
*H02J 13/00* (2006.01)
(Continued)

(52) U.S. Cl.
CPC .............. *H02J 3/14* (2013.01); *G05B 15/02* (2013.01); *G05F 1/66* (2013.01); *G06Q 50/06* (2013.01);
(Continued)

(58) Field of Classification Search
CPC ........ G05F 1/66; G06Q 50/06; H02J 13/0075; H02J 2203/20; H02J 3/14; Y02B 70/3225; Y02E 60/76; Y04S 20/222; Y04S 40/22
See application file for complete search history.

(56) References Cited

U.S. PATENT DOCUMENTS

| 2012/0083939 A1* | 4/2012 | Rognli | ...................... H02J 3/14 |
| | | | 700/297 |
| 2013/0035802 A1* | 2/2013 | Khaitan | .................. H02J 3/383 |
| | | | 700/297 |

(Continued)

FOREIGN PATENT DOCUMENTS

| EP | 2 678 918 | 1/2014 |
| WO | 2012/114114 A2 | 8/2012 |

OTHER PUBLICATIONS

Transmittal; International Search Report; and Written Opinion of the International Searching Authority for International Application No. PCT/GB2017/052376, dated Oct. 30, 2017.

*Primary Examiner* — Chad G Erdman
(74) *Attorney, Agent, or Firm* — Katten Muchin Rosenman LLP (57) ABSTRACT

A power distribution control system for controlling a plurality of power assets connected to a power grid is provided. The system includes a server which can identify a set of power assets selected from sources, loads, and stores that are to form a string and provide to the string instructions for response to a change in the power grid. The system further includes a router for each of the power assets in the string, for receiving instructions from the server and for controlling the respective power asset. The power assets in the string are selected by the server to have different response times and/or (Continued)

response profiles, such that the string of assets present a collective response to the change, the collective response being defined by the server.

18 Claims, 6 Drawing Sheets

(51) Int. Cl.
*G05F 1/66* (2006.01)
*G06Q 50/06* (2012.01)
*G05B 15/02* (2006.01)

(52) U.S. Cl.
CPC ....... *H02J 13/0075* (2013.01); *H02J 2203/20* (2020.01); *Y02B 70/3225* (2013.01); *Y02E 60/00* (2013.01); *Y04S 20/222* (2013.01); *Y04S 40/20* (2013.01)

(56) References Cited

U.S. PATENT DOCUMENTS

| | | | |
|---|---|---|---|
| 2013/0079943 A1* | 3/2013 | Darden, II | G06Q 50/06 700/297 |
| 2015/0155710 A1* | 6/2015 | Yamagaki | H02J 3/38 307/18 |
| 2016/0056628 A1 | 2/2016 | Burstall et al. | |
| 2017/0194790 A1* | 7/2017 | Kim | H02J 3/386 |
| 2017/0331325 A1* | 11/2017 | Ristau | G05B 15/02 |
| 2017/0358929 A1* | 12/2017 | Koeppe | H02J 13/0096 |
| 2018/0262139 A1* | 9/2018 | Oguguo | F02D 29/06 |

\* cited by examiner

POWER DISTRIBUTION CONTROL SYSTEM WITH IMPROVED RESPONSIVENESS

FIELD OF THE INVENTION

The present invention relates generally to the field of electrical power control systems, and more particularly, to systems, methods, and apparatus embodiments for actively managing power assets such as power generation sources, loads or storage devices, connected to an electric power grid.

DESCRIPTION OF BACKGROUND ART

The current invention relates to large-scale electric power grid systems. An example of such grid systems is the National Grid in Great Britain (GB), comprising a high-voltage synchronised Alternative Current (AC) transmission network connecting a large number of power generators and loads, across England, Scotland and Wales, running at a predetermined preferred frequency of 50 Hz. Supply of electric power, by power sources such as power stations and generators, and demand of electric power, by loads such as consumer households and large public buildings, are kept in a state of balance. If there is a sudden deficit in supply in power relative to demand, caused for example by a sudden drop in supply, the operating frequency may drop; on the other hand, if supply suddenly overtakes demand, the frequency may increase. In order to ensure the power grid operates properly, it is necessary to maintain the frequency within a small margin of the preferred frequency (e.g. 50 Hz+/−0.1 Hz). Normally, the grid can be described as naturally balancing: it is arranged such that if one generator slows down and contributes to lowering the grid frequency, the others should up their speed and compensate for said lowering. The inertial, self-propagating nature of the system acts as a form of safety control and self-regulation.

More generally speaking, the maintenance of the grid operating frequency within an acceptable and safe range involves controlling the balance between power supply and demand in the grid, and by being responsive to deviations from said balance. The responsiveness needs to be at a second-by-second or even sub-second level. This operating scheme of a power grid system is called "frequency response".

It is desirable to provide a method of operating a power distribution system or grid, or a set of power assets in the system, that maximises and/or optimises their responsiveness, power capacity and availability, in order to maintain the grid operating conditions within acceptable margins, in anticipation of possible changes or in the event of actual changes in the system such as sudden frequency drops, or mere small fluctuations in frequency or voltage.

In the field of battery management, WO 2015/116408 A2 (Steffes et al) discusses a method of managing power consumption by a plurality of energy storage devices. Based on their charge levels or remaining storage capacities, the energy storage devices are controlled to individually consume electrical energy at individual consumption rates such that the aggregation of their individual rates is at a target rate.

SUMMARY

In accordance with the present invention, a power distribution control system for controlling a plurality of power assets connected to a power grid is provided. The system comprises a server for identifying a set of power assets selected from sources, loads, and stores that are to form a string and for providing to the string instructions for response to a change in the power grid or in measured local conditions, and a router, for each of the power assets in the string, for receiving instructions from the server and for controlling the respective power asset. The power assets in the string are selected by the server to have different response times and/or response profiles, such that the string of assets present a collective response to the change, the collective response being defined by the server, and/or a collective response that fulfils multiple services requested by the server (which may include a service or services that are conditional upon a local change in the power grid or other locally measured change).

In one aspect, the power assets in the string may be selected by the server to comprise at least two of the following types: sources, loads and stores. In one aspect, the power assets in the string may comprise a generator (such as a diesel generator) and a battery. In another aspect, the power assets may comprise a thermal load.

In another aspect, the power assets in the string are stores such as batteries, and the collective response comprises discharging the stores into the power grid.

The routers may communicate with routers of other power assets in the string on a peer-to-peer basis. A router server may be provided, coupled to each of the routers of other power assets in the string, to facilitate peer-to-peer communication between those routers. The server may communicate with the routers of the power assets in the string and indicate to each router what are the other assets of the string, so that the routers of the assets can commence communication with each other. A first router of the string may report the response of a corresponding first asset to a second router of the string, and the response of a second asset corresponding to the second router is conditional upon the response of the first asset as received from the first router.

Preferably, the server provides instructions to the routers to cause the respective assets to respond to a change in frequency and/or voltage in the power grid, as measured at each asset. The power assets in the string are preferably selected by the server (based on information stored in a database regarding the anticipated responses of the assets to different events) to present a collective response of at least a predetermined level over at least a predetermined duration. The server may send instructions to the routers in the string to activate or deactivate at different times in response to the change. The power assets in the string may respond to the change autonomously without receiving further instructions from the server. Each asset in the string, having responded to a change, preferably sends a report to the server via its respective router. The server may send further instructions to the string of power assets based on these reports.

The server may instruct a subset of power assets in the string to cease its response in response to a report or reports that the collective response of the string is above a predetermined level or satisfies one or more predetermined criteria.

The server may instruct a subset of power assets in the string to withdraw from a string in response to a report or reports that the collective response of the string is above a predetermined level or satisfies one or more predetermined criteria.

In accordance with another aspect of the invention, a method of operation of a power distribution system having a plurality of power assets is provided. The method comprises: providing a local controller for controlling each of the power assets and a server in communication with the local controllers; identifying at the server a set of power assets that are to form a string; and sending a message from the server to each controller in the string, the message including instructions for response to a change in the power grid. The power assets in the string are selected by the server to have different response times and/or response profiles, such that the string of assets present a collective response to the change, the collective response being defined by the server.

In one aspect, it is advantageous to be able to deploy a sufficiently large supply from power sources (e.g. generators) in response to any frequency change in the grid, whether a small fluctuation or a sudden frequency change of a certain magnitude.

In another aspect, it is valuable to maintain a sufficiently large power (source or load) capacity and availability at all times or specified times, in preparation for a possible large frequency drop, for example due to an unexpected loss of a power source from the system or an increase in demand, or for a large frequency rise, for example due to a large power load being switched off leading to a sudden drop in demand.

In another aspect, it is advantageous for assets or strings (subsets) of assets to have a response time that is as short as possible, e.g. on the scale of tens of milliseconds (ms).

In some exemplary cases, it may not be ideal for a set of power assets (such as power sources, loads or stores) in the power grid system to simply provide as much power capacity as possible when a relevant opportunity arises. There may be multiple conditions and incentives to aspire to in the (commercial) operation of a said set of assets in the power grid system. These conditions may be of varying priorities—overriding, auxiliary, optional—and of different natures—based on financial, operational efficiency or safety concerns. For example, the provision and remuneration of power supply may be measured in full units of megawatts (MW). The provision of a fraction of a MW of power above a full integer number of megawatts may be considered as wasteful and undesirable over-provision. In other words, it is generally advantageous to maintain a high level of flexibility in operation of power assets, in view of predetermined objectives and incentives.

DESCRIPTION OF PREFERRED EMBODIMENTS

There may be hundreds of thousands or more of power assets in a large-scale electric grid system such as the GB National Grid. A commercial operator (e.g. a solar farm or a refrigeration plant or an owner of a building with a combined heat and power system) may own and control a subset of these assets, and be contracted to offer an array of services including: (i) deployment of responsive power assets when opportunities such as a frequency drop arise, and (ii) providing availability of responsive power assets in the prospect of possible sudden needs in the grid, and be suitably remunerated for each of these services.

Figure 1:
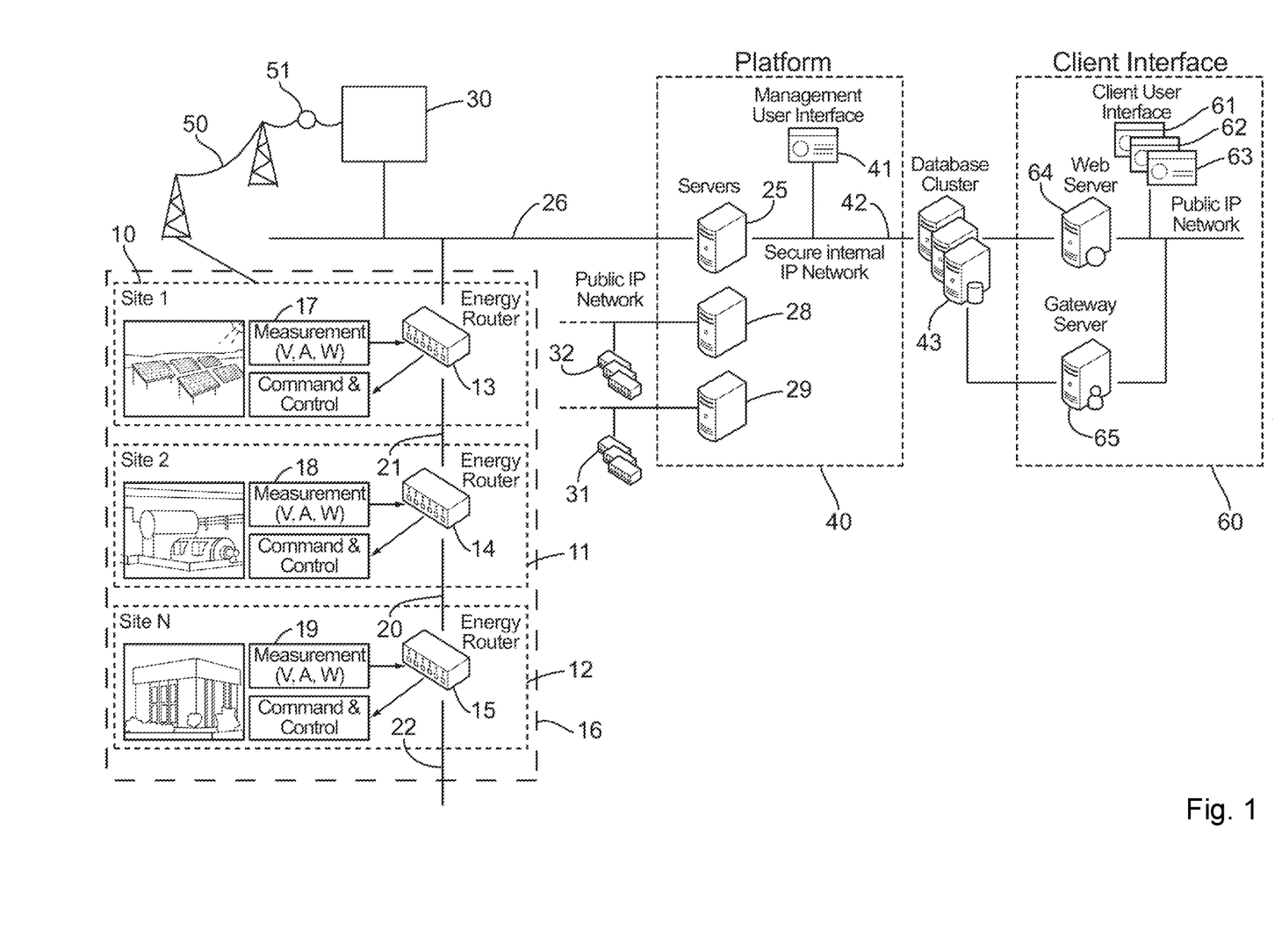
FIG. 1 shows an embodiment of a power distribution control system connected to a power grid.

An exemplary energy distribution system is illustrated in FIG. 1 showing a plurality of power assets or sites 10, 11, 12, each having an energy router, 13, 14, 15 respectively. The power assets may be power sources, loads and stores; in an example, asset 10 may be a power source such as a solar farm, asset 11 may be a responsive load such as a thermal load (heating, air conditioning, refrigerating load) and asset 12 may be a storage site or battery.

The system may be hierarchical in arrangement: the power assets 10, 11, 12 may be positioned, in terms of their electrical connections, at an "end point" of the system energy, and their respective routers 13, 14, 15 may be connected to each other by IP connections 20, 21 and connected to a central server 25 which is at a higher level. The assets may be under control of the server 25. The energy routers are not mere simple router devices for allowing communication between the assets and the server, and peer-to-peer communication between the assets themselves; they are also responsible for monitoring and controlling their respective assets at a local level as will be described.

An exemplary energy router comprises: a processor; means to receive power such as a low voltage DC power adaptor; means for communication, providing both data connection (including to a public IP network and/or a local area network (LAN)) and measuring means 17, 18, 19, such as a metrology circuit with multiple measurement inputs, to measure present levels of current and voltage being supplied, consumed or absorbed by the site and/or line frequency. It preferably also has: electric power to external devices, such as a power-over-ethernet (PoE) controller; a dual ethernet physical layer integrated circuit; a transceiver; ethernet port(s); USB host port(s); RS 485 standard port(s); cables; and random access memory and flash memory to store local control parameters and priority parameters (e.g. peak and off-peak power prices).

The router may have an IP address allocated to it for the purposes of the public IP network; this IP address may be communicated to or provided by the server. The router may be connected to a LAN for the corresponding site, via an ethernet port. Over this LAN the processor may send local commands to control power consumption, generation or absorption by said site.

As shown in FIG. 1, each power asset or site 10, 11, 12 has a corresponding measurement means 17, 18, 19. This allows the frequency and/or level of the current, the power input/output, the voltage and/or other related parameters to be measured locally at the site.

In the example illustrated in FIG. 1, power assets 10, 11, 12 and their respective routers 13, 14, 15 are formed into a group. This group may be a responsive string 16 of power assets. Further power assets, not shown in FIG. 1, may be included in this string via connection 22.

Additional groups or responsive strings of assets, such as cluster 30, may be connected to server 25 in the system via network 26 which may be a public IP network. There may be further servers 28, 29 in the system, each corresponding to respective cluster(s) or string(s) of assets 31, 32. Together servers 25, 28 and 29 may form a control platform 40 under the management of a management user interface 41. The servers connect via a secure internal IP network 42 to a database cluster 43.

A client interface 60 may be provided for access to a web server 64 (with, optionally, a gateway server 65). The client interface 60 may contain a plurality of client user interfaces 61, 62, 63 connected by the public IP network 26 to the web server 64.

In the exemplary power distribution system, the grid 50 supplies power to assets 10, 11, 12 and groups and clusters thereof 30, 31, 32. The grid 50 may have a pinch point 51 in the form of some connection, substation or switch, which has a particular rating specification or limit. Such information may be stored in database cluster 43.

The functions and responsibilities of a central server (such as server 25) may include monitoring the availability of each of the power assets for which they are responsible. It may also store information on the properties of those assets, such as: their power capacities, delivery capabilities, energy requirements, parameters indicative of how flexible said capacities, capabilities and requirements are (e.g. response times, dead times), geographical location and topological position in the power system relative to other assets; alternatively, the database cluster 43 may be responsible for storing said information and the server 25 may retrieve said information from it, or both the database cluster 43 and the server 25 may store some or all of said information about the power assets.

The server 25 may also be responsible for storing high-level objectives; monitoring or receiving information on the status of the power grid 50 to which the system is connected, and power requirements and requests on the system; and sending instructions to power assets in the system on how to respond, based on the information it has access to as mentioned above (asset properties and availabilities, high-level aims). In particular, the server 25 may instruct a subset of assets under its control to form a responsive string 16, whose assets 10, 11, 12 are operable to communicate and negotiate with each other to attempt to fulfil server-level objectives in a responsive manner.

Aspects of such an arrangement have been described in previous GB patent application no. 1414724.3 titled "Power Distribution Control System" and PCT patent application no. PCT/GB2014/0525423 titled "Power Distribution Control System" by the same applicant.

In one scenario, in view of a frequency drop in the grid 50, the server 25 may be operable to instruct a subset of assets 10, 11, 12 under its control to form a responsive string 16 to respond to the frequency drop and provide additional power capacity to the grid 50 as appropriate.

However, when there is an overriding requirement that the response time be as short as possible, in a hierarchical arrangement it may not be possible for the central server in a system of assets to send instructions to the assets (e.g. to form responsive strings of assets) based on a real-time monitoring of the grid status. For example, in an effective system of assets for providing power capacity in any useful way to the GB National Grid, in the event of a sudden frequency drop from 50 Hz, an asset will need to have reacted or started its response within 2 seconds, or reached its full capacity within 10 seconds.

Accordingly, such a system would preferably comprise means to monitor the grid status, be triggered by an event and identify a need for a response within a sub-second scale, e.g. 200 ms. This may not be possible if the central server is the sole means of making decisions and is required to send instructions to the assets (e.g. to assemble a string of assets in response to a frequency drop), not least because of physical limitations such as the maximum speed of data transfer on currently available optical fibres (leading to delays of above 200 ms).

It is thus desirable that the server, instead of responding to an instance of frequency (or voltage) drop, is operable to instruct a subset of assets under its supervision to form a responsive string to be ready to respond to a potential frequency (or voltage) drop happening in the grid 50 at a future time.

Figure 2:
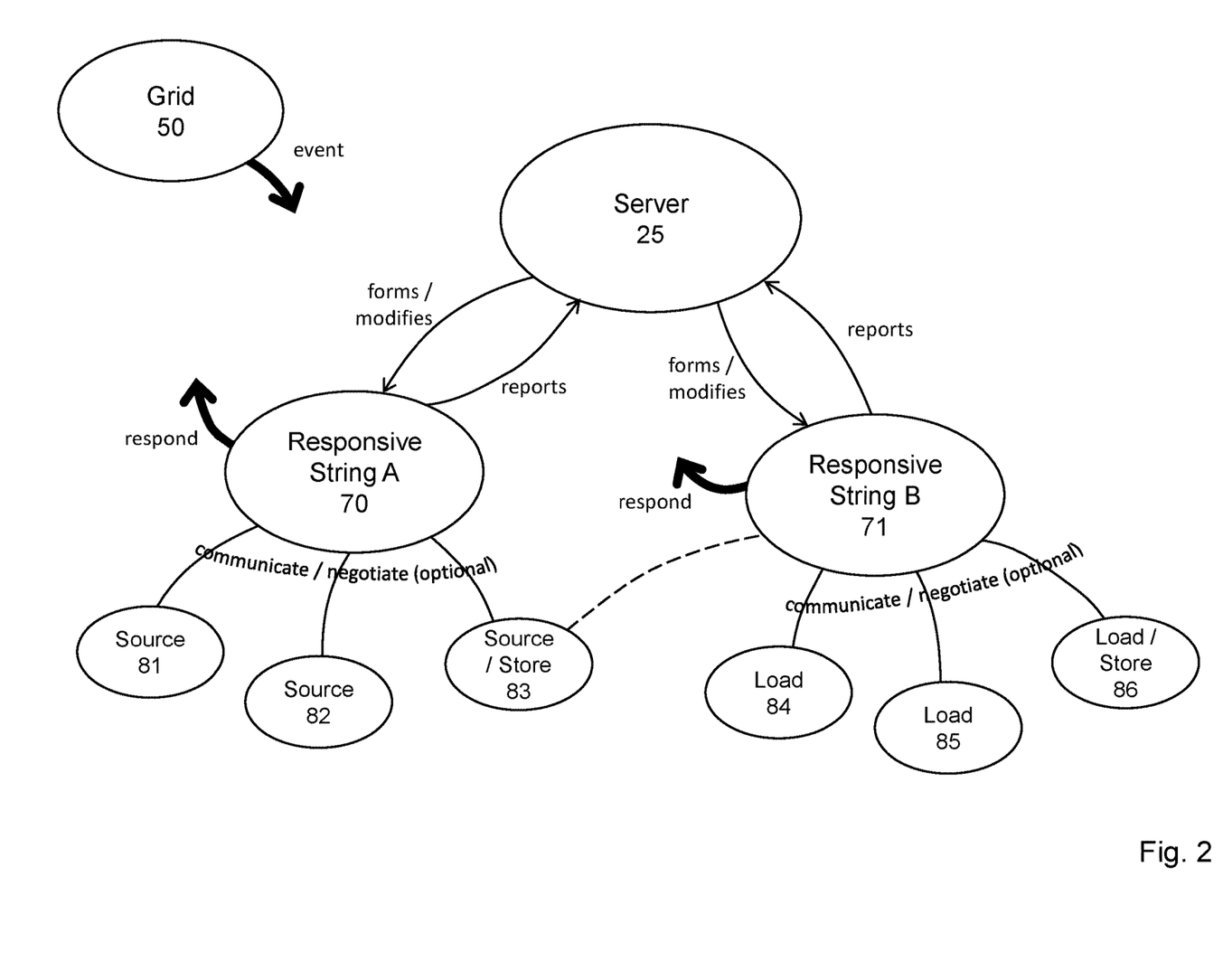
FIG. 2 is a state diagram illustrating the relationship between different elements of the power distribution control system.

FIG. 2 is a schematic state diagram illustrating the relationships between different elements in an embodiment of a power distribution control system. A server 25 is operable to form responsive strings, such as responsive string A 70 and responsive string B 71, and receive reports from them. Responsive string A includes three power assets or end points: power source 81, power source 82, and power source/store 83. Responsive string B includes three power assets or end points: power load 84, power load 85, and power load/store 86. These are all connected to the grid 50. The events or changes in the grid are perceived by the power assets in the system, and the grid receives a power response from said assets. In this diagram, only one server, two strings and six power assets are illustrated, but it is understood there any number of servers, strings and assets can be included.

In this embodiment, the end points 81-86 themselves, i.e. the assets such as power sources or generators in the system, are empowered with sufficient intelligence and autonomy, so that decision-making can be delegated away from the central server 25, to a lower level in the hierarchical system. Even though the server 25 stores or has high-level access to information about the assets, it is required that the immediate decision-making happens locally. An embodiment of such an arrangement may allow the end points to have received knowledge, prior to any responsive action, of high-level aims to achieve or incentives to consider. The server may also provide prior instructions, for example when forming the string, to the assets so that they activate or deactivate at specified and/or different times in response to a change in the grid.

Under such an arrangement, if an end point or a plurality of end points 81-86 perceive a frequency drop in the power grid 50, they can make a decision to respond accordingly by providing power capacity (e.g. turning on power generators, deactivating loads, discharging power storage). The decisions made by end points may be completely autonomous and independent from each other, or alternatively they may be based on peer-to-peer communication or negotiation between the end points; in either case, this decision-making does not at this point require the oversight or authorisation of the central server 25 in the system. The end points may negotiate and/or cooperate with each other in specific ways. In one example, a first end point 81 of responsive string 70 reports its response, via its respective router, to the router of a second end point 82 in the same string, and the response of the second end point 82 is conditional upon said report received from the first end point 81. The condition may be that the second end point only commences its response once the first end point has reached a certain point in its power response. To implement this type of cooperative strategy, the server may have sent a prior conditional command to the assets including specific instructions at the time of forming the string.

As illustrated in FIG. 2, the plurality of end points or assets 81-86 may have already been grouped into a responsive string 70, 71 by the server 25 at an earlier time. After the end points have carried out the response to changes in the grid frequency, the server can be notified that the response has taken place. It is noted that the frequency of the grid can be measured locally, for example by measurement means 17, 18, 19 associated with each end point.

There are different types of assets in terms of their temporal properties. For example, different power sources, loads and stores may have different response times, or different operational endurance times. At least for the discussion below, the response time of a power asset (whether a source, load or store) means the time taken by the asset to reach a certain level or percentage (e.g. 50%, 95% or 100%) of the full power capacity required (e.g. 1 MW) after receiving a command to activate or deactivate; the endurance time of an asset means the length of time for which the asset can maintain its power capacity above a predetermined level or percentage of the full capacity, regardless of whether it subsequently drops off abruptly or tails off gradually. Separately, the response time of the system as a whole can be described as the time taken for the system to detect an event, check if it is a valid event, allow for possible internal system propagation delays, and send commands to the assets and other parts of the system.

For example, Combined Heat and Power (CHP-type assets are generally very fast in response. In the event of the frequency going above 50 Hz, the fast-response CHP loads can be switched off very quickly; in the event of a drop below 50 Hz, they can be switched on quickly. Similarly, batteries can be accordingly charged or discharged, and sources activated or deactivated very quickly. On the other hand, other types of power assets may be slower in response. For instance, diesel generators normally take tens of seconds to respond. In general, mechanical-based assets usually take more time to activate or deactivate.

As an example, in order to provide 1 MW of power, a system of power assets contains some assets that can operate to provide necessary power capacity for 3 minutes, but requires 10 seconds to charge, and other assets that only take 10 milliseconds to charge but only endure for 30 seconds. Typically, frequency responsiveness needs to be delivered in sub-second timescales and to endure for periods of the order of minutes. Therefore it is advantageous to have the capability to selectively combine assets of different strengths and shortcomings, for example by assembling them into a responsive string of assets, operable to communicate internally and/or respond autonomously without delay to deliver the required power profile in the shortest time possible and with the necessary endurance (i.e. above a predetermined minimum endurance time). In other words, a system with this capability to manipulate assets enjoys increased flexibility as well as optimised responsiveness, whether the manipulation is done on a general or case-by-case basis. As described above, the requirement for a short responsive time and real-time control may necessitate, in some embodiments, the non-involvement of a central server due to inevitable time delays. As a result, based on knowledge of the properties of the assets, responsive strings of assets may be formed by the server in preparation ahead of potential deployments. The assets may also have already been informed of high-level objectives and incentives to aspire to.

It is noted that a power asset may belong simultaneously to two responsive strings, as indicated by a solid line in FIG. 2 connecting source/store asset 83 to responsive string A and a dashed line connecting it to responsive string B. The server or the strings themselves, via their routers, may negotiate among themselves an optimised manner in which this asset is utilised when necessary. Of course, power assets belonging to one string can be re-allocated from one string to another by the server 25.

Figure 3:
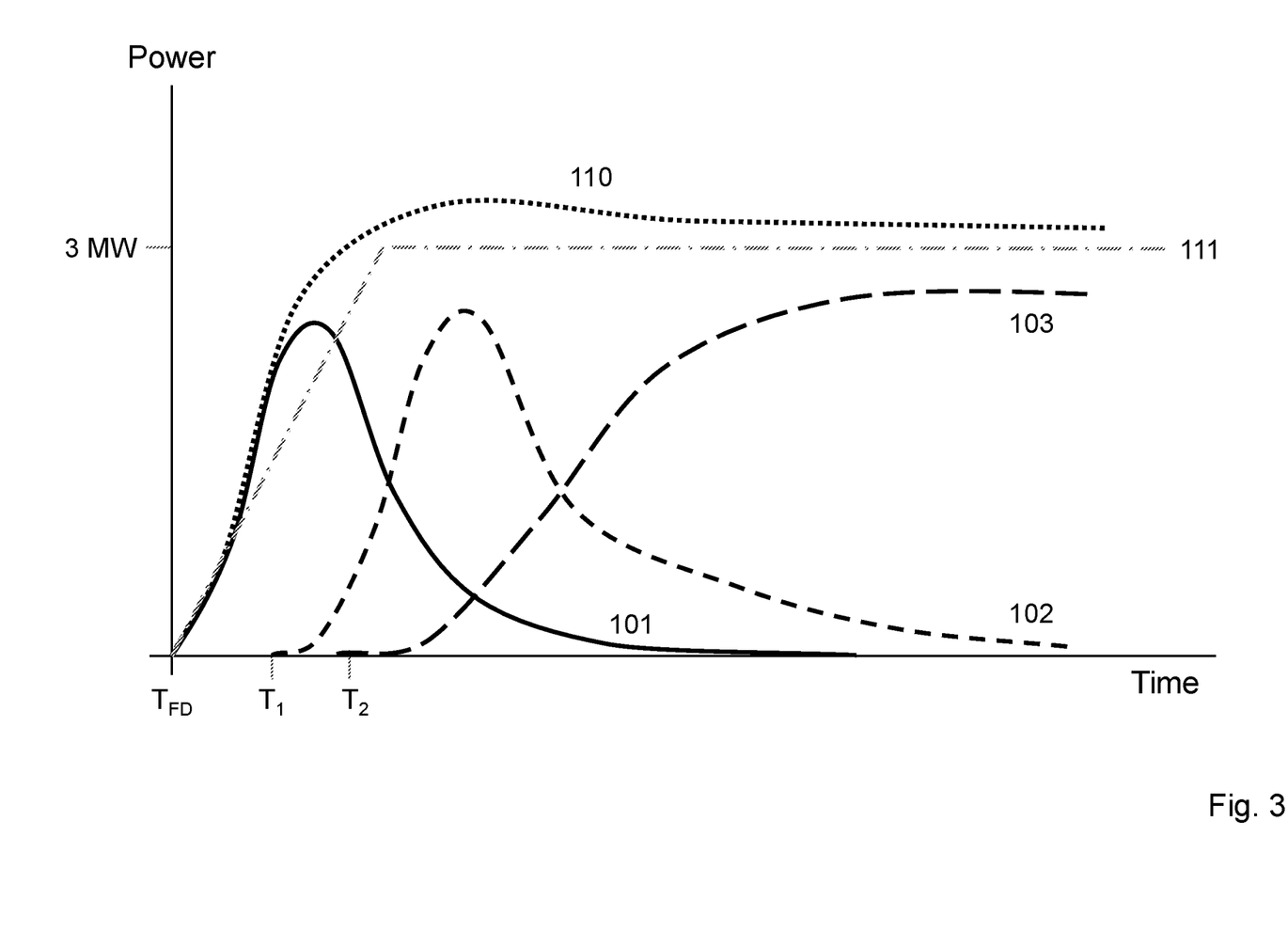
FIGS. 3, 4A and 4B illustrate different examples of power responses of a power distribution control system.

FIG. 3 is a time diagram illustrating an example of how a responsive string with multiple power assets operates. This responsive string may correspond to responsive string A 70 of FIG. 2. The three curves 101, 102, 103 illustrate the power output provided to the grid 50, in megawatts (MW), by each of the power assets 81, 82, 83 respectively. These assets may be power sources such as generators, or stores such as batteries.

In this example, a frequency drop occurs in the grid 50 at time $T_{FD}$. In response to such a frequency drop, the server 25 would ideally like to deliver additional power to the grid in accordance with an envelope 111. For example, the server 25 may have pre-arranged to deliver such a response upon occurrence of such an event. The idealised envelope 111 is shown in terms of power delivered, with a rising edge, a steady state and a falling edge (not shown). The rising edge may be steep and difficult to achieve with many available power assets. The falling edge may be more gradual. The idealised envelope may be defined in other terms such as voltage or frequency. In this example, the server has determined that in response to a particular frequency drop, 3 MW of power are required from the string 70 if possible. The particular response may be dependent on the particular event measured.

In the scenario illustrated, first power asset 81 has a very short responsive time. It may or may not be capable of delivering the required power. In the illustration, it is not quite capable of doing so. Its capacity is below 3 MW. Its response is shown by curve 101 in FIG. 3. Second power asset 82 is of a similar nature and its response curve 102 is very similar. A third power asset 83 is available. As shown by curve 103, it is able to endure for a longer period of time to provide power to the grid.

The server 25 has allocated these three power assets to a string (optionally with other power assets). It has done so in one of two ways. In a first embodiment, it has defined start times ($T_{FD}$, $T_1$, $T_2$) for each of the assets. In an alternative embodiment, the assets determine these start times among themselves, based on the response of each, as will be described. A combination of these options is possible, with assets (e.g. asset 81) having start time defined by the server 25 and others (e.g. assets 82 and 83) responding to events in the string and responding to the performance of other assets in the string.

As illustrated, asset 81 is the first asset to respond and output extra power to the grid. A second power asset 82 responds at time $T_1$ after a delay, providing a capacity which is also below 3 MW, as shown by curve 102. The combined power output of all assets, shown by curve 110, exceeds 3 MW. However, both first and second power assets 81, 82 have a relatively short endurance. The third power asset activates at time $T_2$. This delay may be due to a longer intrinsic response time or may be a deliberate dead time. As shown by curve 103, it is able to endure for a longer period of time to provide power to the grid. This maintains the total power provision, by responsive string 70, to be above the required 3 MW as shown by curve 110 for the necessary period of time.

This arrangement described with reference to FIG. 3 applies mutatis mutandis to an example where the assets are responsive loads and there is a rise in frequency and/or voltage and the responsive loads respond to the rise in frequency and/or voltage.

As previously mentioned, there may be multiple objectives and considerations in deciding how to react to events such as a frequency drop or fluctuation in the grid. A system or string of assets can provide a plurality of different services or power responses. The strategy chosen and carried out need not be one that provides the fullest and/or fastest power response, if there are objectives that are of a higher priority from the point of view of the service provider/operator of the system of assets.

Accordingly decision-making algorithms are included in the server 25 and the routers 13, 14 and 15, which take into account different potential strategies related to different services that a system of assets can offer.

Figure 4A:
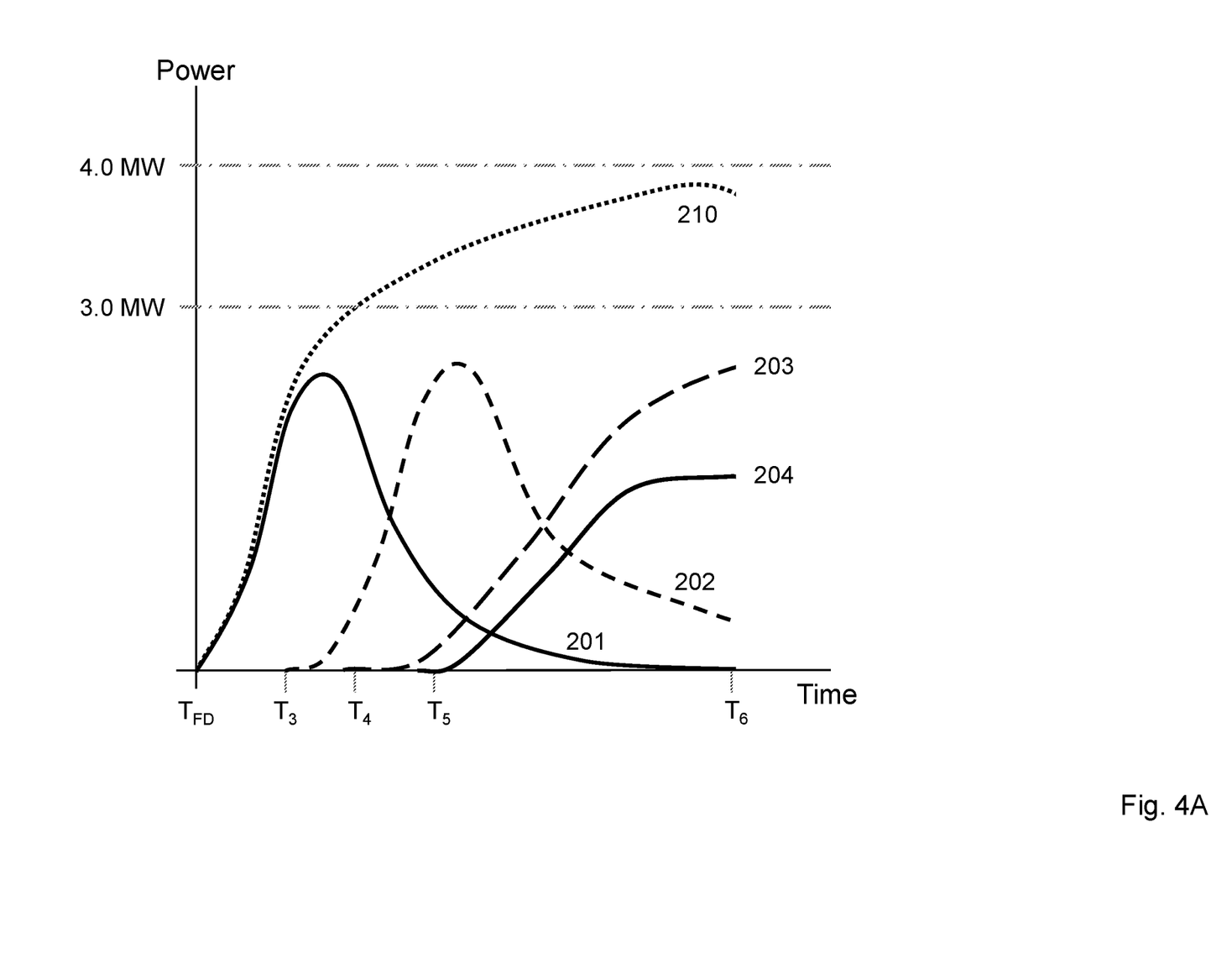

In an exemplary situation based on previously described incentives, it may happen that, in response to a frequency drop in the grid and a need for activation of more power sources such as generators, a string of assets responds, providing a total power output between 3.0 MW and 4.0 MW, e.g. 3.8 MW. This exemplary scenario is illustrated in FIG. 4A, in which four power sources and/or stores activate successively at times $T_{FD}$, $T_3$, $T_4$ and $T_5$ respectively (represented by curves 201, 202, 203 and 204 respectively), with a total of 3.8 MW provided at $T_6$, as shown by curve 210.

There may be incentives (such as but not limited to financial remuneration schemes or efficiency considerations), in connection to certain predetermined criteria. For example, it may be desirable that one or more predetermined power output thresholds should not be exceeded. For example, it may be desirable that the amount of power offered (in response to changes in the grid) be above a specified quantum (such as an integer value of megawatts) while adhering as close as possible to just that quantum. In this case, providing the 0.8 MW above the 3.0 MW threshold is considered wasteful over-provision. It would be preferable to hold the additional 0.8 MW in reserve (as available power or, in the case of responsive loads, as an available responsive load).

Figure 4B:
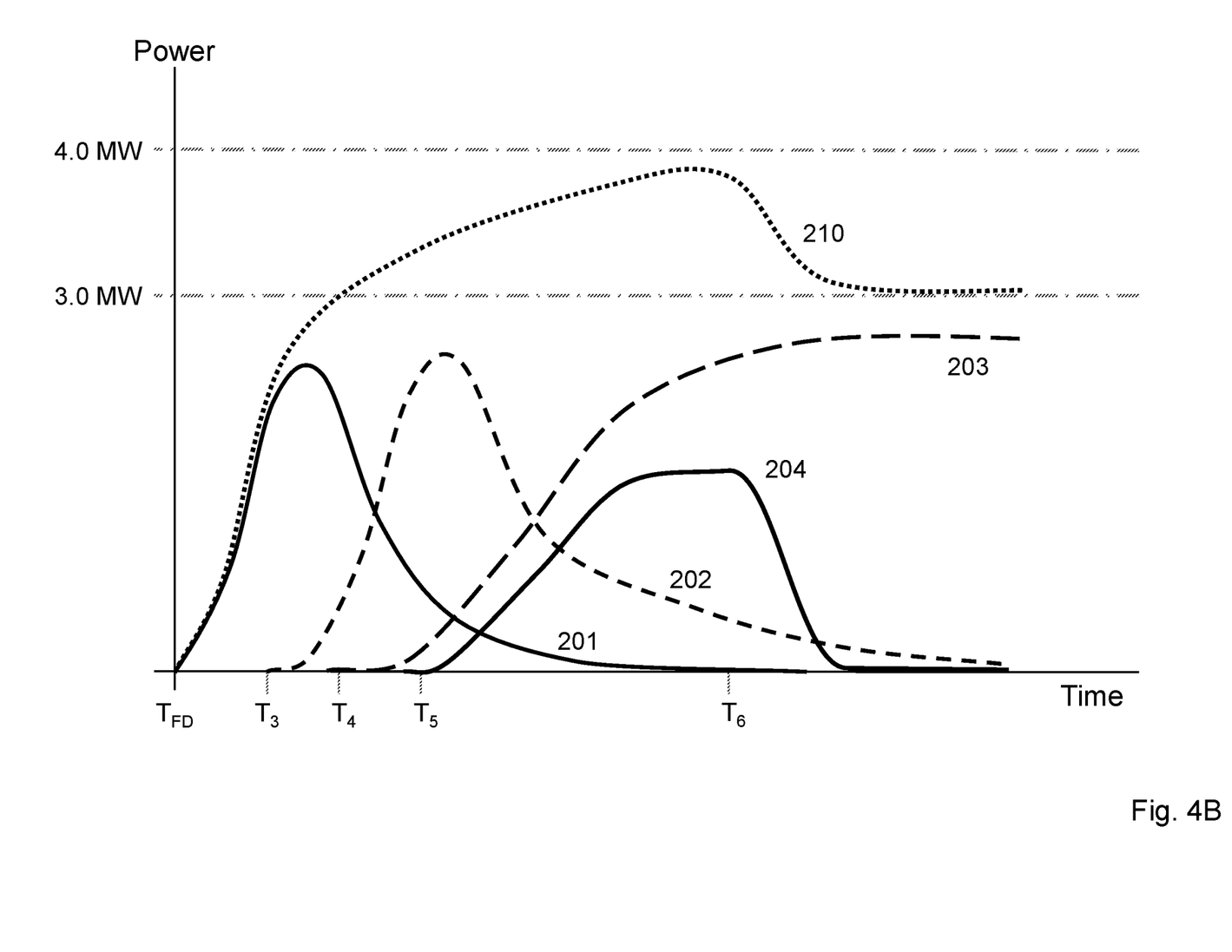

In the current arrangement, the central server responsible for the string containing the four assets is operable to instruct a subset of the assets of the string, in this case the asset corresponding to the curve 204, to drop out (either to leave the current responsive string, or to be deactivated), so that the total power output of the string is reduced but remains above 3.0 MW. The consequence of this instruction, carried out at time T6, is illustrated in FIG. 4B.

A decision to cause the asset to drop out may be based on knowledge that the dropping out of this specific asset would result in a decrease in the power output of the string by an amount smaller than 0.8 MW (or, in the case of a responsive load, a decrease in the power consumption). The approximately 0.8 MW of "saved" unused power capacity may then be considered as part of the system's "availability" or contingency and as a result it can boost the system's future responsiveness instead of being used up.

The assets in the responsive string (four assets in the above example) have preferably been already arranged as a responsive string, under the oversight of the respective server, ahead of the frequency drop in the grid. When a frequency drop occurs, the string is able to respond thereto with a short response time, providing 3.8 MW of power, in view of the fact that quick responsiveness is a highly prioritised property. Subsequently, it may be that the server monitoring the system, though associated with a connection-based time delay, detects the over-provision which does not align with known incentive schemes (this detection may be based on one or more reports sent from the string of assets to the server), and as a result intervenes and issues overriding instructions to reduce the total power provision to only just above 3.0 MW.

In another exemplary scenario, a set of assets initially have the capacity to provide 2 MW of power, but subsequently can only provide 1.5 MW due to some unforeseen reason such as breaking down of a generator or operational cost considerations. The server may respond to this change of capacity and instruct some assets to drop out to provide only 1 MW for maximum efficiency. It may be preferable to have succeeded in delivering a quantum (e.g. 1 MW) of responsiveness in accordance with a desired envelope rather than falling short of delivering a higher quantum.

The scheme or method to operate a power distribution control system in terms of quanta of power as described above and illustrated by FIGS. 3, 4A and 4B may be called "granular responsiveness". Similar to the above examples in which power sources such as generators and stores such as batteries respond to a frequency drop in the grid by providing extra power output, granular responsiveness can equally be applied mutatis mutandis to a scenario in which there is a rise in frequency, and power loads are switched on or off in response, to provide incremental quanta of load capacity. This advantageously saves unused load capacity and boosts the system's responsiveness.

The currently disclosed power distribution control system and method to operate such a system combine a fast response with the operability to effectively provide extra time for further decision-making that is otherwise not possible, because of the importance or necessity for a near-instant response.

An aspect of the control provided by the server may be to tell a local asset or router what to do in the event of a frequency drop or rise. Another aspect may be to decide to take an asset off the list of assets available in a string, or deactivate the responsiveness of an asset at a future time. These aspects of control take time on account of delays associated with the involvement of the server, such as the need to go through a stored list or database of a large number of assets, but they can take place in advance of an event in the grid so that the assets are prepared to respond quickly to the event.

Figure 5:
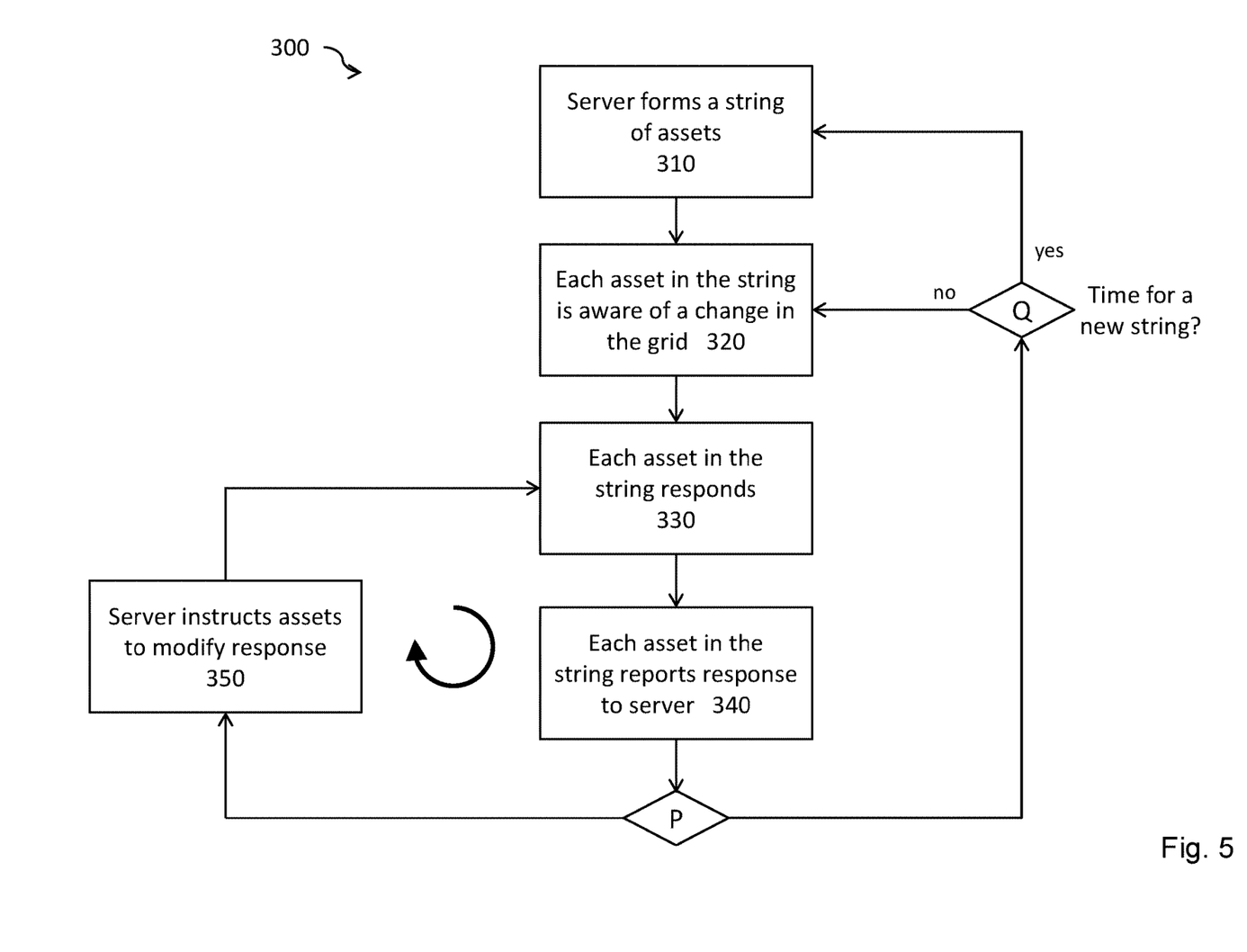
FIG. 5 is a flow diagram illustrating a method of operating a power distribution control system.

FIG. 5 is a flow diagram illustrating an exemplary method 300 of operating a power distribution control system as currently disclosed. At step 310, a server selects a subset of power assets, from a plurality of power assets in a power system connected to a power grid, to form a (responsive) string. This may be based on known knowledge about the power assets in preparation of a frequency drop or fluctuation or other event in the grid. The server sends instructions to the assets of the string, via their routers, to implement the formation of the string. These instructions indicate to each router what the other assets of the string are so the routers can commence communication with each other.

At step 320, each asset in the string is aware of a change in the grid. This change may be a sudden drop or rise in frequency or voltage. As the whole system is connected to the power grid, other strings and clusters assets and high-level server(s) may at the same time be aware of the same change in the grid.

At step 330, the assets in the string respond to provide a power input or load as necessary in response to the change in the grid. This responding may involve activation or deactivation of some of its power assets which may include power sources, loads and stores; the assets have the autonomy to decide on and carry out the response, either independently of each other, or via communication and negotiation between assets via respective routers, without the involvement of the central server.

After step 330 each asset in the string reports its response to the server (step 340). The server may then issue an instruction to modify the string response of the string or certain assets in the string (step 350). The assets in the string proceed to carry out their response according to its new instruction (the method loops back to step 330).

The string continues this loop (steps 330, 340 and 350) until, at point P the response is complete or more significant server intervention is required. If the response is complete and no new string formation is required (Q—no) the process returns to step 320 and awaits a new change to which a response is needed. If it is decided that a new string formulation is needed (Q—yes), the process returns to step 310. This need may be based on operational reasons or other scheduling reasons. The server can then form a new string of assets and the new arrangement will replace the current one. Assets can be added to or removed from the string. The method re-continues from step 310.

It is noted that P and Q are merely exit points in two nested loops and can be re-arranged in different ways to achieve the same outcomes.

As described, that the server 25 may send instructions to one or more routers 13, 14, 15 enabling the routers to act on the instruction of the server. This is true even in the case of lost communications from the server (or lost communication between routers). It is not mandatory for the routers to confirm the action taken in real time, but it is expected that eventually all routers will confirm the amount of delivered service (for example for billing purposes). The volume of service delivered across all the assets may include contingency for eventual individual failures to deliver and may be defined by other parts of the control system. This autonomy on the part of the routers enables them to respond promptly to events in the grid.

Alternatively, the server 25 sends instructions to one or more routers 13, 14, 15, but expects real time confirmation of the service delivery. The server can use the confirmations to verify that the correct volume of distributed service has been delivered, and take corrective actions if new assets need to be invoked to complete service delivery. This may generate a short period of underdelivery in case of lack of confirmation signal from particular asset(s). There are some services which are compatible with such short (typically seconds) periods of underdelivery. Alternatively, there may be overdelivery if contingency is included for individual failures and there is less failure than the level provided for. Overdelivery for a matter of a few seconds may be considered trivial, provided that the assets can cease their delivery and promptly return to the position of being responsive (i.e. available to respond afresh).

In a third possible scenario, the server instructs many energy routers 13, 14, 15, etc. and expects the routers to coordinate between themselves on a peer-to-peer basis. The routers can communicate directly between themselves if the network topology allows for that. If the network topology does not allow for direct peer-to-peer contact (as is typical when routers sit behind different firewalls), then the routers could use a server (e.g., referring to FIG. 1, routers in cluster or string 32 could use server 28) in a capacity of a router to create a network layer which allows for fast peer-to-peer exchange of information. Creating such a network layer means that each of the routers would have a point-to-point connection (for example a VPN) between the router and the routing server 28, the routing server 28 would then be routing the traffic between different routers within cluster 32. This routing server 28 does not have to be the same as the server (server 25) that initially asked for delivery of the service. The routing server 28 could be a network point that has visibility of all routers within its string and is capable of routing data packets between them. The routing server may have lower latency by virtue of being physically closer to the routers it serves (than the server 25) and/or by being dedicated to the task of routing between those routers. The routing server does not have to communicate with the server 25 (but it preferably does also communicate with the server 25). In either case, the string is able to respond to the requests of the server 25 as a collective entity in a short time scale and each router is able to report back to the server 25 the results of its response (reporting their individual responses directly to server 25 or through the routing server 28, or reporting their collective response to the server 25 through the routing server 28).

It is noted that assets such as but not limited to refrigeration loads (and their compressors) may have so-called dead times. Such assets may take a non-negligible period of time to turn on or off. It is undesirable for a set of assets to be operated in such a way that some of their dead times overlap and the set becomes not fully responsive or less responsive at certain times as a result. The central server may monitor such a contingency and control the operation of individual assets such that the set of assets as a whole remain responsive to possible or actual changes in the grid and power requirements. Aspects of such an arrangement have been described in previous GB patent application no. 1515911.4 titled "Refrigeration Load with Improved Responsiveness".

The above description of embodiments and examples is given by way of example only. Various aspects and embodiments of the invention can be combined. Various aspects and embodiments can be modified in accordance with other aspects and embodiments. The scope of the invention is not to be limited by details of the embodiments, but is defined in the appended claims.

The invention claimed is:

1. A power distribution control system for controlling a plurality of power assets connected to a power grid, the system comprising:
   a server for selecting, from a plurality of power assets selected from sources, loads and stores, a first subset of power assets to form a first string and a second subset of power assets to form a second string, based on respective individual response capabilities of the power assets in responding to a potential future change in the power grid, and for providing to the first and second strings instructions for response to the potential future change in the power grid; and
   a router for each of the power assets in the first and second strings, for receiving instructions from the server and for controlling the respective power asset;
   wherein the power assets in the first string are selected by the server to have different individual responses and the power assets in the second string are selected by the server to have different individual responses, whereby each of the power assets in the first and second strings takes its respective time to reach a predetermined percentage of full power capacity required of that asset and each has its respective endurance time over which it can maintain its power capacity above a predetermined percentage of full capacity for that asset, and
   wherein the instructions from the server instruct the routers in the first string to activate or deactivate at different times in response to the potential future change when it happens in the power grid and the routers in the second string to activate or deactivate at different times in response to the potential future change when it happens in the power grid such that the first and second strings of power assets present a first and second collective response to the change respectively, each collective response being an attempt to achieve an idealized response envelope and defined by the server.

2. The system in accordance with claim 1, wherein the power assets in the first and second strings selected by the server comprise at least two of the following types: sources, loads and stores.

3. The system in accordance with claim 2, wherein the power assets in the first and second strings comprise a generator and a battery.

4. The system in accordance with claim 2, wherein the power assets in the first and second strings comprise a thermal load.

5. The system in accordance with claim 1, wherein the power assets in the first and second strings are stores such as batteries, and the collective responses includes discharging the stores into the power grid.

6. The system in accordance with claim 1, wherein the routers in the first or second string communicate with routers of other power assets in the same string on a peer-to-peer basis.

7. The system in accordance with claim 6, wherein a routing server is provided, coupled to each of the routers of other power assets in the same string, to facilitate peer-to-peer communication between those routers.

8. The system in accordance with claim 6, wherein the server is further operable to communicate with the routers of the power assets in the same string and to indicate to each router what are the other assets of the same string, so that the routers of the assets can commence communication with each other.

9. The system in accordance with claim 8, wherein a first router of the first or second string reports the response of a corresponding first asset to a second router of the same string, and the response of a second asset corresponding to the second router is conditional upon the response of the first asset as received from the first router.

10. The system in accordance with claim 1, wherein the server provides instructions to the routers to cause the respective assets to respond to a change in frequency and/or voltage in the power grid, as measured at each asset.

11. The system in accordance with claim 1, wherein the server re-allocates a power asset from the first or second string to the other string.

12. The system in accordance with claim 1, wherein the server selects a power asset to simultaneously belong to the first and second strings of power assets.

13. The system in accordance with claim 1, wherein the power assets in the first or second string are operable to respond to the change autonomously without receiving further instructions from the server.

14. The system in accordance with claim 1, wherein each asset in the first or second string, having responded to the change, sends a report to the server via its respective router.

15. The system in accordance with claim 14, wherein the server sends further instructions to the same string of power assets based on said reports.

16. The system in accordance with claim 1, wherein the server instructs a subset of power assets in the first or second string to cease its response in response to a report or reports that the collective response of the same string is above a predetermined level or satisfies one or more predetermined criteria.

17. The system in accordance with claim 1, wherein the server instructs a subset of power assets in the first or second string to withdraw from the same string in response to a report or reports that the collective response of the string is above a predetermined level or satisfies one or more predetermined criteria.

18. A method of operation of a power distribution system having a plurality of power assets, the method comprising:
providing a local controller for controlling each of the power assets and a server in communication with the local controllers;
selecting, by the server, from the plurality of power assets, a first subset of power assets to form a string and a second subset of power assets to form a second string, based on respective individual response capabilities of the power assets in responding to a potential future change in the power grid; and
sending a message from the server to each controller in the string, the message including instructions for response to the potential future change in the power grid;
wherein the power assets in the first string are selected by the server to have different individual responses and the power assets in the second string are selected by the server to have different individual responses, whereby each of the power assets in the first and second strings takes its respective time to reach a predetermined percentage of full power capacity required of that asset and each has its respective endurance time over which it can maintain its power capacity above a predetermined percentage of full capacity for that asset, and
wherein the instructions from the server instruct the routers in the first string to activate or deactivate at different times in response to the potential future change when it happens in the power grid and the routers in the second string to activate or deactivate at different times in response to the potential future change when it happens in the power grid such that the first and second strings of power assets present a first and second collective response to the change respectively, each collective response being an attempt to achieve an idealized response envelope and defined by the server.

* * * * *